(12) United States Patent
Baker

(10) Patent No.: US 12,421,695 B2
(45) Date of Patent: Sep. 23, 2025

(54) SCRAPER CONTROL METHOD HAVING VARIABLE OPERATING MODES CORRESPONDING TO OPERATOR EXPERIENCE LEVELS

(71) Applicant: Deere & Company, Moline, IL (US)

(72) Inventor: Jake J. Baker, Dubuque, IA (US)

(73) Assignee: Deere & Company, Moline, IL (US)

( * ) Notice: Subject to any disclaimer, the term of this patent is extended or adjusted under 35 U.S.C. 154(b) by 244 days.

(21) Appl. No.: 18/454,678

(22) Filed: Aug. 23, 2023

(65) Prior Publication Data

US 2025/0067026 A1    Feb. 27, 2025

(51) Int. Cl.
| | |
|---|---|
| *E02F 9/26* | (2006.01) |
| *B60W 40/105* | (2012.01) |
| *B60W 50/00* | (2006.01) |
| *B60W 50/02* | (2012.01) |
| *B60W 50/14* | (2020.01) |
| *E02F 9/20* | (2006.01) |

(52) U.S. Cl.
CPC ........... *E02F 9/264* (2013.01); *B60W 40/105* (2013.01); *B60W 50/0205* (2013.01); *B60W 50/14* (2013.01); *E02F 9/205* (2013.01); B60W 2050/0083 (2013.01); B60W 2050/143 (2013.01); B60W 2050/146 (2013.01); B60W 2300/17 (2013.01); B60W 2556/10 (2020.02)

(58) Field of Classification Search
CPC ....... E02F 9/264; E02F 9/205; B60W 40/105; B60W 50/0205; B60W 50/14; B60W 2050/0083; B60W 2050/143; B60W 2050/146; B60W 2300/17; B60W 2556/10
See application file for complete search history.

(56) References Cited

U.S. PATENT DOCUMENTS

| | | |
|---|---|---|
| 5,493,798 A | 2/1996 | Rocke et al. |
| 6,092,863 A | 7/2000 | Hagenbuch et al. |
| 6,247,538 B1 | 6/2001 | Takeda et al. |
| 7,326,023 B2 | 2/2008 | Hagenbuch |

(Continued)

FOREIGN PATENT DOCUMENTS

WO    2012157381 A1    11/2012

*Primary Examiner* — Curtis A Kuntz
*Assistant Examiner* — James E Munion
(74) *Attorney, Agent, or Firm* — Gary L. Montle; Lucian Wayne Beavers; Patterson Intellectual Property Law, PC

(57) ABSTRACT

A system and method including a scraper may include an operator training routine using in-cylinder position sensing to notify the operator via an operator interface (e.g., mounted onboard display, smartphone, etc.) when they are doing something potentially damaging to one or more scraper components or otherwise injecting inefficiency into work operations. Audible and/or visual notifications may for example be enabled for operators of/below a specified skill level, for specified movement speeds, etc. In an embodiment, to utilize advanced automation capabilities of in-cylinder position sensing, a calibration sub-process is executed to specify a location of the ground plane. The scraper ground plane calibration is requested through an operator interface and prompts lowering of the blade to the ground. Once the blade is detected on the ground plane, e.g., using measured movement characteristics of the blade to determine that the blade has stopped, the in-cylinder position sensor reading is recorded.

20 Claims, 8 Drawing Sheets

(56) References Cited

U.S. PATENT DOCUMENTS

| | | |
|---|---|---|
| 7,458,428 B2 | 12/2008 | Laudick et al. |
| 7,934,329 B2 | 5/2011 | Mintah et al. |
| 8,752,372 B2 | 6/2014 | Ramler et al. |
| 8,948,974 B2 | 2/2015 | Montocchio |
| 9,074,546 B2 | 7/2015 | Asami et al. |
| 9,187,879 B2 | 11/2015 | Suk |
| 9,221,659 B2 | 12/2015 | Fukasu et al. |
| 9,342,091 B2 | 5/2016 | Wuisan et al. |
| 9,347,389 B2 | 5/2016 | Kawaguchi et al. |
| 9,415,953 B2 * | 8/2016 | Bonefas .................. H04N 7/18 |
| 9,803,324 B2 | 10/2017 | Kean et al. |
| 9,815,479 B2 | 11/2017 | Stander et al. |
| 9,822,509 B1 | 11/2017 | Chi et al. |
| 9,908,385 B2 | 3/2018 | Chundrlik, Jr. et al. |
| 10,133,994 B2 | 11/2018 | Nichols et al. |
| 10,479,354 B2 | 11/2019 | Posselius et al. |
| 10,662,613 B2 | 5/2020 | Ready-Campbell et al. |
| 10,968,602 B2 | 4/2021 | Hendricks |
| 11,591,776 B2 * | 2/2023 | Hageman ................ E02F 3/961 |
| 11,686,067 B2 * | 6/2023 | Veasy .................. E02F 3/7645 |
| | | 701/50 |
| 2012/0136524 A1 | 5/2012 | Everett et al. |
| 2017/0233955 A1 | 8/2017 | Berning et al. |
| 2018/0035050 A1 | 2/2018 | Lu et al. |
| 2018/0170719 A1 | 6/2018 | Tasch et al. |
| 2018/0179732 A1 | 6/2018 | Bartsch et al. |
| 2020/0042023 A1 * | 2/2020 | Garvin ................ B60W 30/146 |
| 2020/0238881 A1 | 7/2020 | Hendricks |
| 2020/0325653 A1 | 10/2020 | Hageman et al. |
| 2022/0098828 A1 | 3/2022 | Stander |
| 2023/0066877 A1 | 3/2023 | Peat et al. |

* cited by examiner

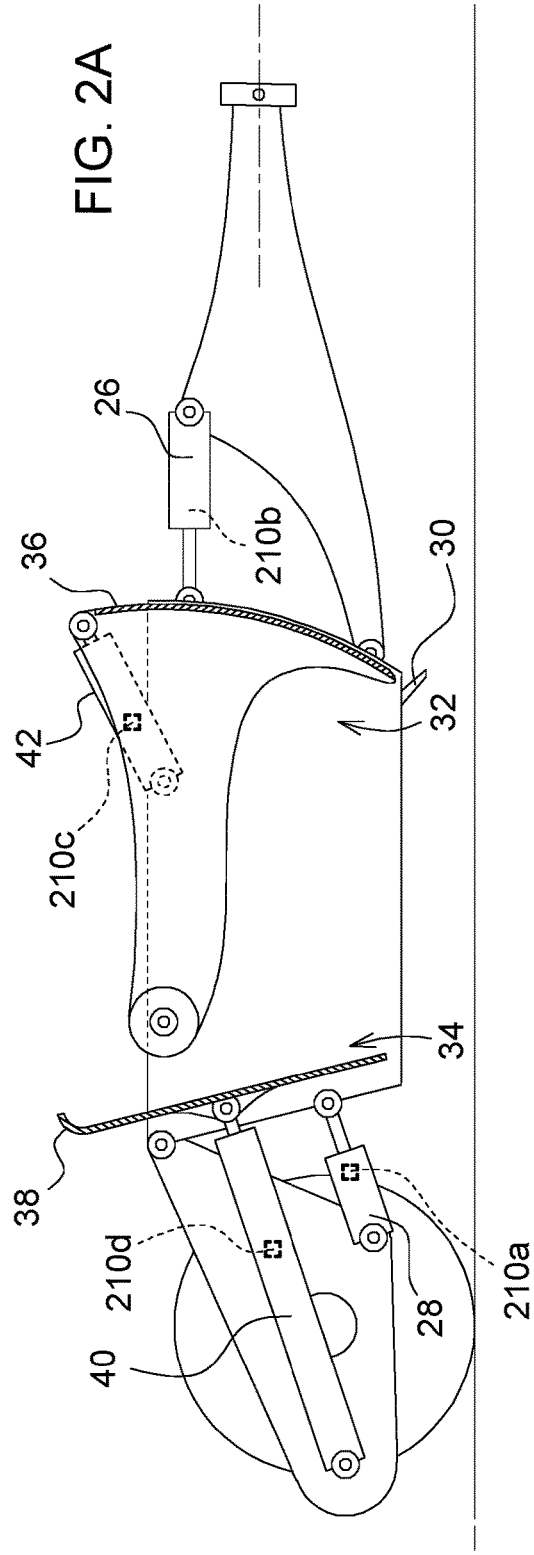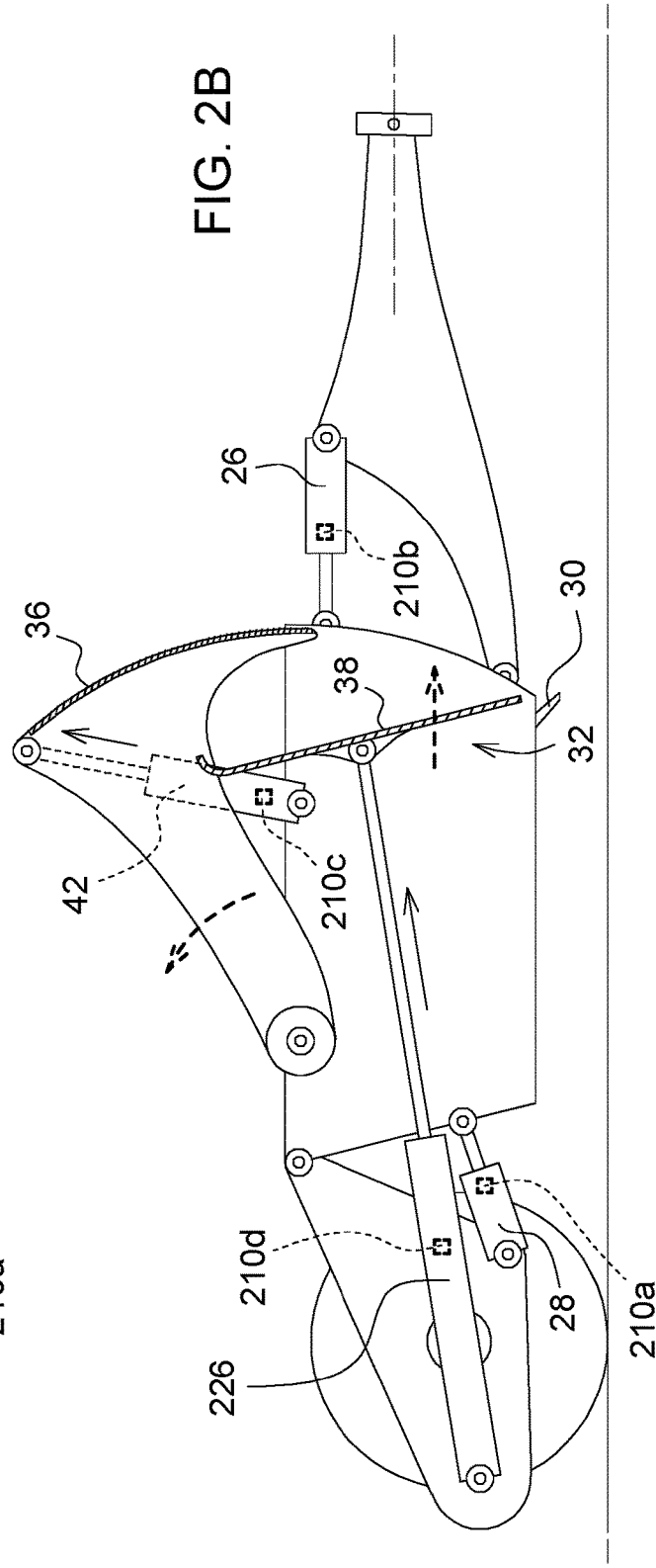

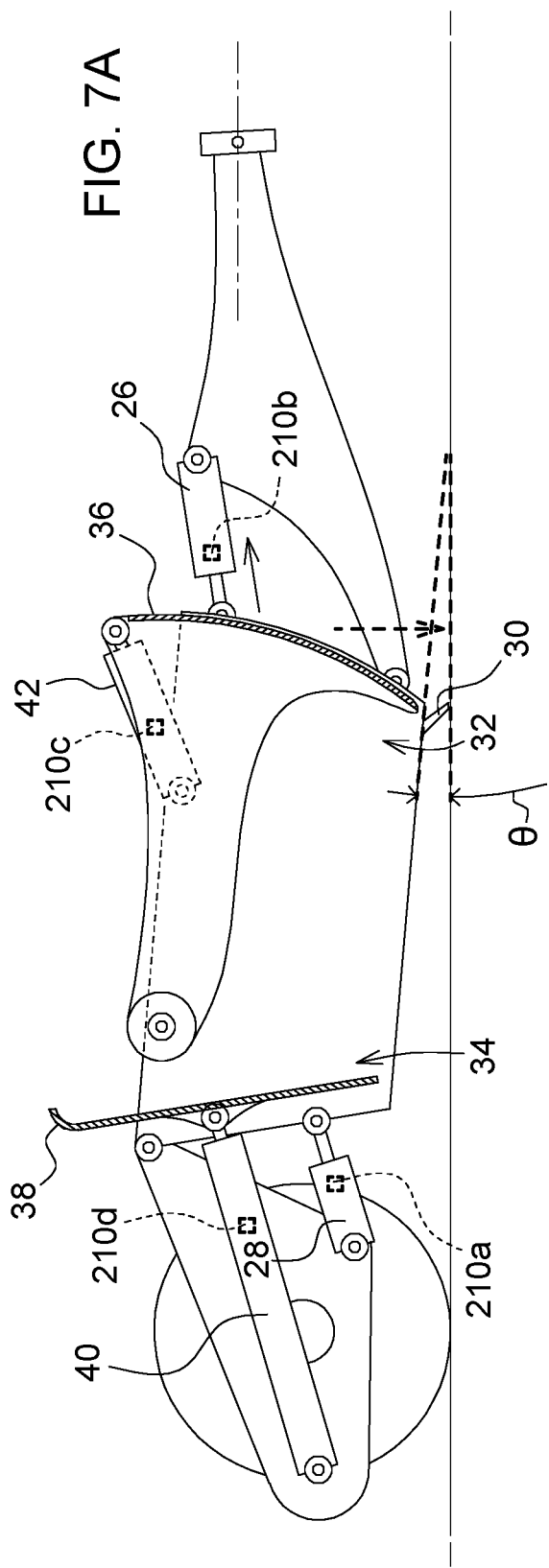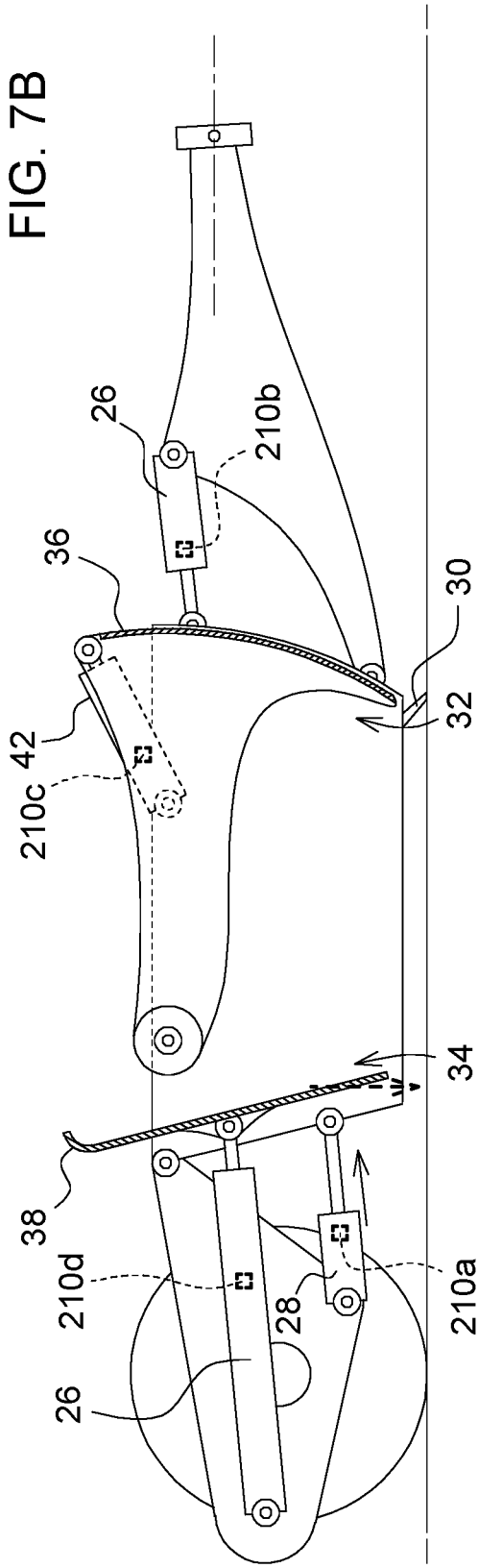

SCRAPER CONTROL METHOD HAVING VARIABLE OPERATING MODES CORRESPONDING TO OPERATOR EXPERIENCE LEVELS

FIELD OF THE DISCLOSURE

The present disclosure relates generally to scrapers that are integrated with or otherwise driven (i.e., drawn or pushed) by a work vehicle to define a self-propelled work unit, and more particularly to systems and methods for facilitating operator training and/or ground plane calibration with respect to such a work unit.

BACKGROUND

Work units as discussed herein may typically include a scraper unit (e.g., including a blade for dislodging material to be moved and a receptacle for transportation of the dislodged material) in combination with a tractor, articulated dump truck, or the like, such that the scraper unit (or equivalent) is functionally integrated with a work vehicle, or coupled to and drawn or pushed by a work vehicle, and thereby define a self-propelled work unit.

However, the scope of the present disclosure may include or otherwise refer to other machines and equipment, self-propelled or otherwise, which fill a loading container thereof with material worked from the ground and further carry the loaded material from a first location to a second location for discharging/unloading there from.

Operating a scraper, or equivalent earth-moving work unit, is a highly personal skill. The associated tasks require an operator with considerable experience and skill and a high level of concentration to operate at an acceptable level of productivity and performance. Further, efficiency (e.g., the amount of earth moved by the work unit over an amount of time or per unit of fuel consumed, etc.) is one way to measure at least part of that skill. Efficiency may also be one way to measure the performance of a particular work unit.

BRIEF SUMMARY

The current disclosure provides an enhancement to conventional work units including but not limited to scrapers for cutting and removing a portion of a ground surface, at least in part by introducing a novel system and method of scraper operator training using in-cylinder position sensing to notify the operator of detected error conditions. Such error conditions may for example include detected scraper component positions, movements, work states, or combinations thereof indicating something potentially damaging to one or more scraper components or that may otherwise inject inefficiency into their operation.

The current disclosure includes further enhancement to conventional such work units at least in facilitating advanced automation capabilities of in-cylinder position sensing by triggering and executing a calibration routine to ascertain the ground plane. The ground plane can vary based for example on blade wear, machine tolerance stack-up, and other variables. The scraper ground plane calibration may be prompted through an operator interface (e.g., onboard display mounted to the work vehicle, a mobile computing device such as a smartphone, etc.) and requires the operator to lower the scraper blade to the ground surface. Once the scraper blade is in contact with the ground plane, the in-cylinder position sensor reading is recorded and used for features that rely on knowledge regarding the ground plane.

In one embodiment, a method is disclosed herein for computer-implemented operational training support method for a work unit comprising a work vehicle having an implement for working material. The method includes, for example in association with a first operating mode having an operator training routine, monitoring input signals corresponding to current values of respective positions and/or work states for one or more actuators associated with loading and/or unloading of material by the implement. One or more operational performance metrics are ascertained for the positions and/or work states, or combinations thereof, of the one or more actuators based at least in part on the identified operating mode. Output signals are automatically generated to cause audible and/or visual alerts via an operator interface associated with the work vehicle, based on a comparison of the current values with respect to the operational performance metrics.

In an exemplary aspect according to the above-referenced embodiment, a movement speed of the work vehicle is monitored, wherein the output signals to cause audible and/or visual alerts are disabled or enabled dependent on the movement speed of the work vehicle.

In another or further exemplary aspect according to the above-referenced embodiment, a number of audible and/or visual alerts corresponding to a violation of at least a first operational performance metric is limited to a maximum number for a specified work cycle.

In another or further exemplary aspect according to the above-referenced embodiment, the output signals are automatically generated to cause audible and/or visual alerts based on a determined error condition from a plurality of available error conditions, wherein one or more models comprise identified correlations between respective error conditions and historical values of respective positions and/or work states for the one or more actuators. For example, an operator skill level may be manually specified, or may be automatically determined at least in part based upon historical data correlating the respective operator to one or more of the plurality of available error conditions.

In another or further exemplary aspect according to the above-referenced embodiment, the method may include detecting a trigger for calibration of input signals from at least a first actuator. Responsive to the detected trigger, the operator is prompted via the interface to initiate adjustment to a position associated with the at least first actuator, such that the implement is brought into contact with a ground plane. Upon ascertaining that the implement is in contact with the ground plane, the method includes recording respective values corresponding to current input signals from the at least first actuator and calibrating the respective values to a ground plane setting.

Ascertaining that the implement is in contact with the ground plane may for example be based on further user input as an indication that the ground plane has been achieved. If the implement (e.g., blade) is being manually adjusted by the operator, ascertaining that the implement is in contact with the ground plane may correspond to a lack of further user input causing the implement to move.

Alternatively, the ground plane may be automatically detected utilizing a measured movement characteristic (e.g., velocity) of the implement (e.g., blade), for example detecting when the measured velocity of the cylinder decreases, indicating the blade has come into contact with the ground plane, and at which point further movement of the blade is automatically disabled. A position corresponding with the exact moment in which the velocity decrease occurred may be captured and utilized as the ground plane. The method may further include prompting the operator for confirmation that the detected ground plane is correct. In the event of automatic blade movement and ascertaining of the ground plane, the method may further include determining that the ground plane has not been properly detected, or determining a lack of confidence in a detected ground plane, in which event the operator may be prompted to manually place the blade on the ground surface.

The manual adjustment may in an embodiment only be prompted responsive to the detected trigger and to satisfying each of a plurality of preconditions corresponding to specified values of respective positions and/or work states for the one or more actuators.

In another embodiment as disclosed herein, a work unit comprises a self-propelled work vehicle having an implement for working material. A first set of sensors are configured to generate data corresponding to operating parameters of the work vehicle. A second set of sensors are configured to generate data corresponding to current values of respective positions and/or work states for one or more actuators associated with loading and/or unloading of material with respect to the loading container. A controller is linked to receive the data from the first set of sensors and the second set of sensors, and configured to direct the performance of steps according to the above-referenced method embodiment and optionally according to any one or more of the above-referenced exemplary aspects.

The work unit may for example comprise a tractor configured to provide tractive force with respect to a scraper unit comprising a loading container and a scraper blade as the implement.

The work vehicle may have integrated therewith a scraper unit comprising the loading container and a scraper blade as the implement.

The one or more actuators may comprise respective hydraulic cylinder units configured through controllable extension and retraction thereof to drive movement of an ejector, a gate, and the loading container, wherein the second set of sensors comprise at least one sensor residing in or upon each of the respective hydraulic cylinder units.

In another embodiment, a system as disclosed herein for operational training support with respect to one or more work units (e.g., respective vehicle-scraper combinations) may include one or more processors communicatively linked to an operator interface and one or more sensors associated with the work unit, and configured to direct the performance in steps according to the above-referenced method embodiment and optionally according to any one or more of the above-referenced exemplary aspects.

Some or all of the one or more processors in such an embodiment may reside on a respective work unit. Some or all of the one or more processors may reside in a remote computing environment such as a cloud computing platform, remote server, mobile user device, or the like. The one or more processors may for example reside across any combination of the above.

Numerous objects, features and advantages of the embodiments set forth herein will be readily apparent to those skilled in the art upon reading of the following disclosure when taken in conjunction with the accompanying drawings.

BRIEF DESCRIPTION OF THE DRAWINGS

FIG. 2A is a side view of the scraper unit of FIG. 1, with the ejector back, the gate down, and the blade elevated.

FIG. 2B is a side view of the scraper unit of FIG. 1, with the ejector forward, the gate raised, and the blade elevated.

FIG. 7A is a side view of the scraper unit of FIG. 1, with the ejector back, the gate down, and the blade lowered to the ground surface via pivoting downward of the front bowl relative to the rear bowl.

FIG. 7B is a side view of the scraper unit of FIG. 1, with the ejector forward, the gate raised, and the blade lowered to the ground surface via collective lowering of the front and rear portions of the bowl (loading container).

DETAILED DESCRIPTION

Figure 1:
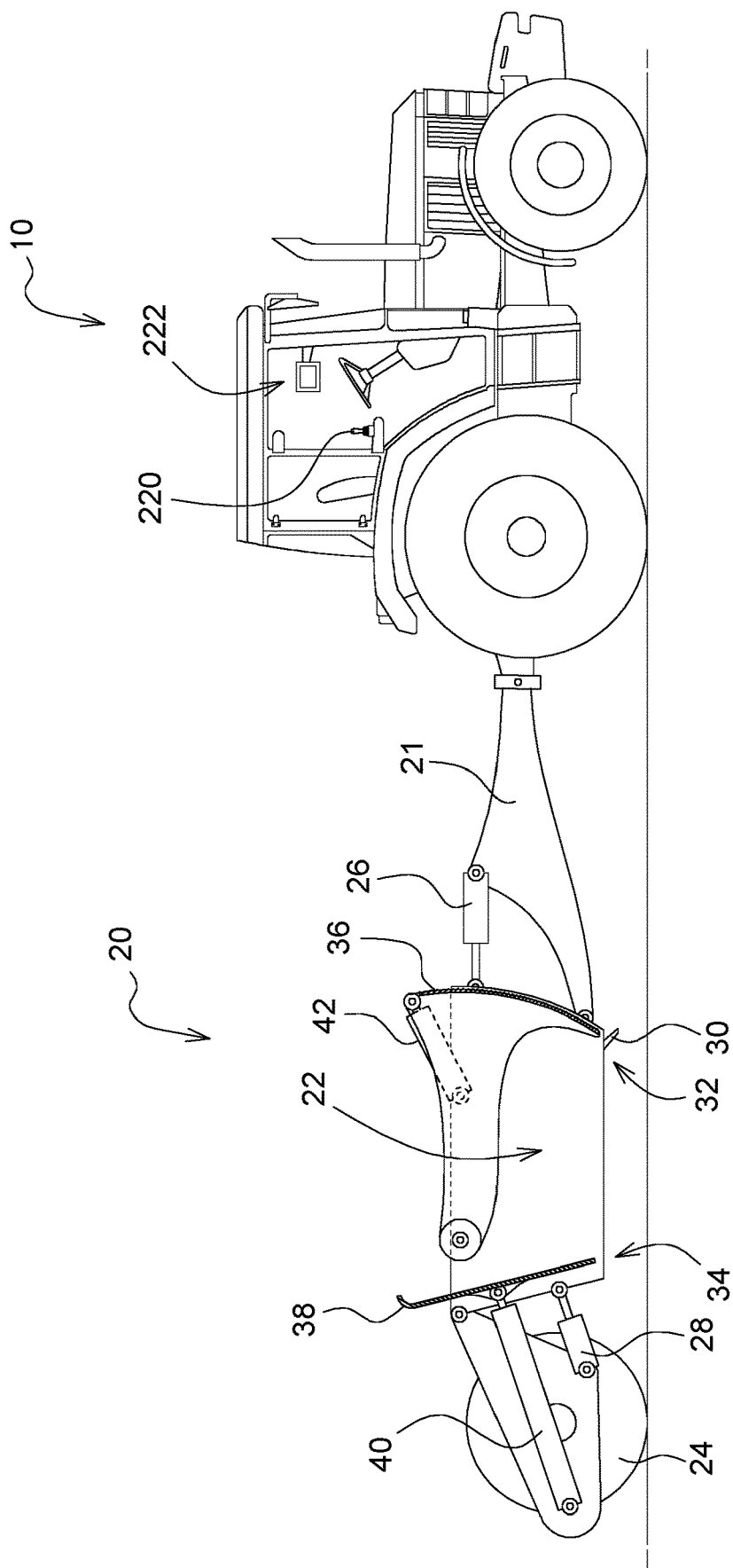
FIG. 1 is a side view representing an exemplary work unit, including a work vehicle and a scraper unit, according to an embodiment of the present disclosure.

In an embodiment of a work unit as disclosed herein, and illustrated by reference to FIG. 1, a scraper 20 is coupled to a self-propelled work vehicle 10, such as a tractor 10 for towing, via a hitch 21. In other embodiments, the work vehicle 10 may be an articulated dump truck, and/or the scraper 20 may be integrated with the work vehicle 10 as opposed to being drawn or pushed thereby, in a manner familiar to those of skill in the art. While the work unit as further described below with reference to FIG. 1 will be referenced generally as comprising a scraper 20 utilizing a blade 30 to work (cut) a ground surface, other machines and associated forms of implements or equivalent earth-working apparatus may nonetheless fall within the scope of the present disclosure unless otherwise specifically noted.

The scraper 20 is adapted to cut (i.e., remove a portion of a ground surface), load, transport, and unload material to another location. A ground-engaging mechanism 24 as shown comprises one or more wheels. However, it is contemplated that the scraper 20 may be propelled, towed, or otherwise supported by way of wheels, continuous tracks, and/or belts, depending on the embodiment desired. The scraper 20 may include an implement such as a blade 30 affixed to a front portion 32 of a loading container 22, or bowl 22, with the blade 30 having a cutting edge for scraping a ground surface. One or more actuators may be provided for adjusting relative heights of the front portion 32 (also referred to as a front bowl) and a rear portion 34 (also referred to herein as a rear bowl) of the loading container 22 and thereby engagement of the blade 30 with the ground surface. The loading container 22 may be embodied as a generally hollow enclosure having an opening at a front end.

The scraper 20 may be provided with a gate 36 positioned at the front portion 32 of the bowl 22 and an ejector 38 positioned inside of the bowl 22 and selectively pushing materials inside the bowl 22 toward the gate 36 via a pushing actuator 40. Such an actuator 40 may be a double-acting telescoping hydraulic cylinder, or in alternative embodiments may include a non-telescoping hydraulic cylinder, a hydraulic motor, a screw or worm gear, chains, cables, or an electric motor or actuator, either alone or in combination with each other. In accordance with an embodiment of a material unloading control unit 204, the pushing actuator 40 may be controlled by the flow of hydraulic fluid from an electro-hydraulic valve which receives pressurized hydraulic fluid from a hydraulic pump, which is rotationally coupled to, and powered by, an engine via a transmission. Alternatively, the hydraulic pump may be directly powered by the engine without an intermediate transmission.

In a loading operation, for example as controlled using a material loading control unit 202, and while the work vehicle 10 moves forward, the blade 30 as a cutting edge of the scraper 20 engages the ground and the material is separated from the ground, and the gate 36 opens a limited amount to permit the material to enter the bowl 22 while positioned to keep the material from flowing out. In an embodiment, movement of front bowl actuator 26 and of rear bowl actuator 28 maybe controlled to adjust the height of respective pivot units and direct a vertical shift of the transverse axis the bowl 22 pivots around, wherein an attack angle of the cutting edge is controllable by adjusting the height of the pivot units from the ground plane. FIG. 7A illustrates an example wherein the front bowl actuator 26 retracts to lower the front portion 32 of the bowl 22 and FIG. 7B illustrates an example wherein the rear bowl actuator 28 extends to lower the rear portion 34 of the bowl 22, making the attack angle shallower than that represented in FIG. 7A.

When the material has accumulated in the bowl 22 to a desired amount, the operator may decide to lift the bowl 22 to perform a transporting operation (i.e., assume a travel position), using a material transporting control unit 206 and as shown in FIG. 2A. In the transporting operation, the bowl 22 is raised to a store position, which provides sufficient distance between the bottom of the bowl 22 and the ground such that a bump or an object on the ground may not easily hit the bowl 22 while the work vehicle 10 is hauling the scraper 20. In addition, the gate 36 is fully closed during the transporting operation. When the scraper 20 reaches a designated location, the unloading operation may be performed, as shown in FIG. 2B. The gate 36 is opened by a gate actuator 42. At the same time, the pushing actuator 40 extends to move the ejector 38. The ejector 38 accordingly pushes the material toward the front portion 32 of the bowl 22 to unload the material.

Figure 3:
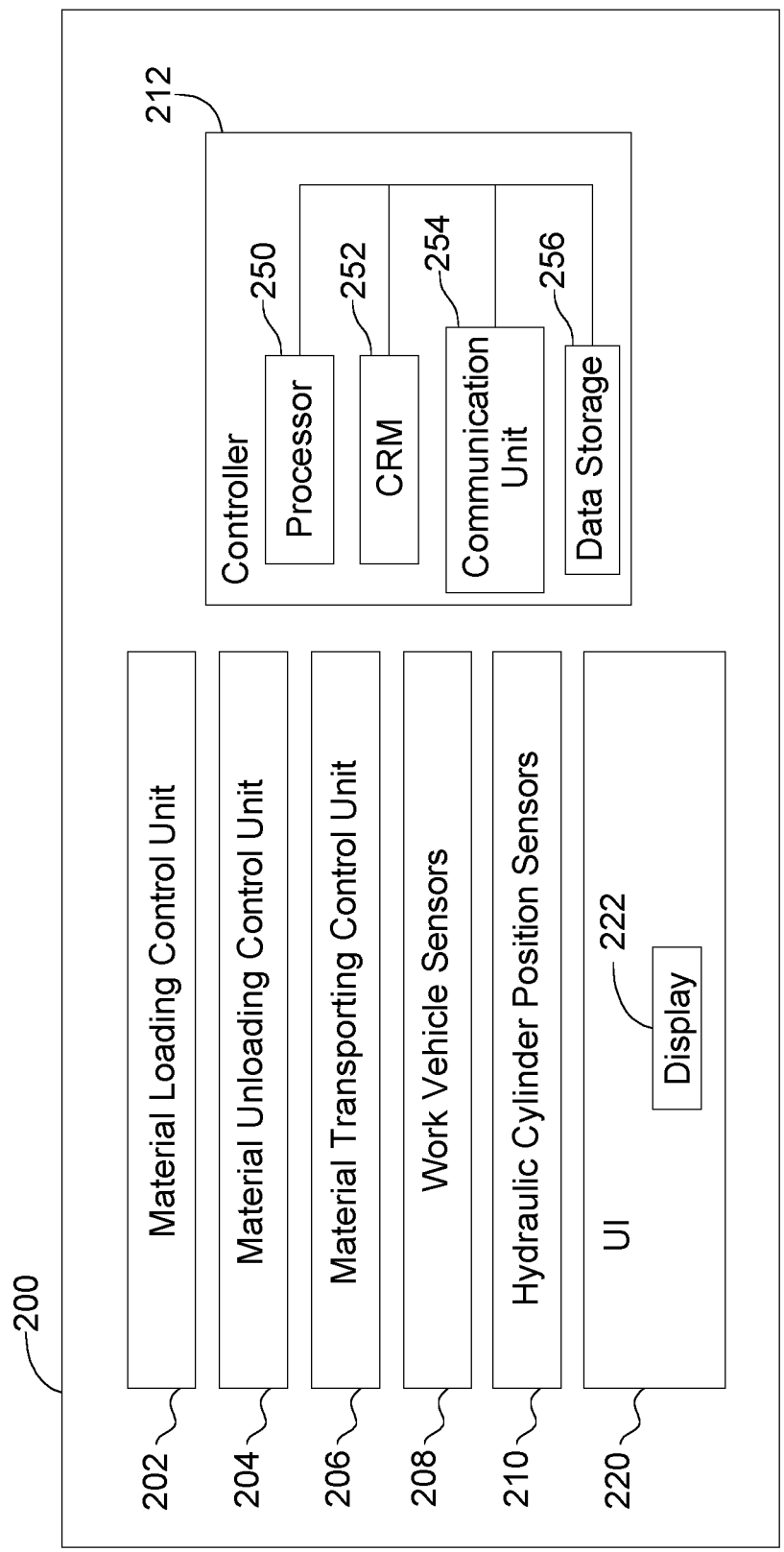
FIG. 3 is a block diagram representing an embodiment of a control system according to the present disclosure.

Further by reference to FIG. 3, an exemplary control system 200 for the work unit may include a single controller 212 or discrete controllers for each of the scraper 20 and the work vehicle 10. The work vehicle 10 of the work unit, whether drawing or otherwise integrating the scraper 20, may include an operator cab within which are disposed one or more operator interface devices 220 located proximal to an operator seat and configured to generate control signals and/or present displays (via display unit 222) associated with operation of the work unit. In one example, the operator interface 220 may be used to receive user inputs regarding and further generally, or selectively, display information regarding operation of the work vehicle 10 and/or of the scraper 20. The scraper 20 may include one or more actuator position sensors 210 functionally linked to the controller 212, which are shown in FIGS. 2A-2B as in-cylinder sensors 210a, 210b, 210c, 210d.

The operator interface 220 may be used for, e.g., adjusting an attack angle θ of the blade 30 and a cutting edge height (the height of the blade 30 relative to the ground). The operator interface 220 may include, for example, one or more joysticks, a touch screen, a switch, a knob, a voice control device, or other means to set up or adjust components of the scraper 20.

For example, the operator may use a joystick to increase or decrease the cutting edge height (and/or set up a desired cutting edge height), wherein the height adjustment is completed by pushing or pulling the lever. Alternatively, the operator may use the joystick, a touch screen, a switch, a knob, a voice control device, or other means to set up or adjust the cutting edge height. A height control signal from the joystick to control the cutting edge height may be received by the controller 212. In another implementation, a single joystick of the operator interface 220 may adjust the desired attack angle and the cutting edge height.

In an embodiment, an advance speed of the work unit and/or other work vehicle operation values as determined for example using work vehicle sensors 208 configured for that purpose may be displayed on the display unit 222 associated with a operator interface 220, along with other information such as the gear of the transmission, the weight of the material (payload) being hauled by the work unit and within the bowl 22, the state of one or more actuators 26, 28, 40, 42 associated with components such as the gate 36 or the ejector 38 (e.g., fully retracted, extending, fully extended, retracting) as indicated by signals from the actuator position sensors 210 themselves, and/or via for example command signals associated with a material loading control unit 202, a material unloading control unit 204, and/or a material transporting control unit 206.

The display unit 222 may be interactive and enable an operator of the work unit to edit settings or parameters associated with the work unit through buttons, a touchscreen, or peripherals in communication with the operator interface 220. The display unit 222 may also display a current position of the work unit, past or planned routes for the work unit, and/or a target profile for the ground surface. As further described below, such displays may be overlaid with or otherwise modified by various selected prompts, alerts, and the like dependent in part on a skill level/training mode according to the present disclosure, and further optionally in view of required calibration routines as a condition precedent with respect to further operations.

The operator may control the work unit through a combination of operator interface 220 tools located inside the operator station, such as throttle and brake pedals and a lever which may be actuated to control components of the scraper 20 such as via the control units 202, 204, 206, wherein for example (in the context of a scraper unit including an ejector 38 as illustrated in FIG. 1) an actuation position of the lever may control the speed at which the ejector 38 moves. Actuation of the lever in a first direction may cause the ejector 38 to move and unload material from the bowl 22, while actuation of the lever in a second direction may cause the ejector 38 to reverse course and prepare the bowl 22 to receive another load of material.

The control units 202, 204, and/or 206 may also enable automated or semi-automated control of, e.g., the unloading of material from the bowl 22 through a switch such as a button positioned on the lever, a detent of the lever, or an alternative user input elsewhere in the operator station. When the operator actuates the switch, it may activate an automated or semi-automated ejection mode for the work unit in which the ejector 38 unloads the material in the bowl 22. Optionally, this automated ejection mode may include returning the ejector 38 to its initial position at the end of the cycle so the work unit is prepared to accept another load of material in the bowl 22.

Although not shown, the control system 200 may include a volume sensing and/or payload weighing unit, for example coupled to the bowl 22 of the scraper 20. The payload weighing unit may generate payload data or equivalent output signals based on a payload in the bowl 22. The payload data may for example be derived from a volume sensor to identify one or more of a volume and a fill level of the payload in the bowl 22 of the scraper 20. Exemplary volume sensors may include one or more of an infrared camera, a stereoscopic camera, a PMD camera, or the like. One of skill in the art may appreciate that high resolution light detection and ranging (LiDAR) scanners, radar detectors, laser scanners, and the like may be implemented as time-of-flight volumetric sensors within the scope of the present disclosure.

Work vehicle sensors 208 may include a GNSS receiver system which determines its position and communicates that position to controllers 212 or display units 222 throughout the work unit. In other embodiments, components of a work unit positioning system utilized may vary, and may include one or more of satellite, cellular, or local positioning signals, or inertial sensors, and these systems may directly determine position or communicate with another system which determines position.

Generally speaking, the controller 212 may be in communication with any or all of the electro-hydraulic valve, engine, transmission, control units 202, 204, 206, sensors 208, 210, operator interface 220, display unit 222, along with various other sensors and tools as may otherwise be described herein but not shown in the figures. The control units 202, 204, 206 may in various embodiments encompass components of the controller(s) 212, the sensors 208, 210, and other intervening controllers, actuators, communications media, and the like as may be appreciated by those of skill in the art. The controller 212 may for example receive signals indicative of parameters of the engine, such as those relating to rotational speed (speed), torque, and power, and may control certain aspects of the operation of the engine, such as rotational speed, torque, and power. The controller 212 may communicate with the engine through intermediate components, such as an engine control unit (ECU), and thus may control the engine indirectly by sending commands to the ECU, which in turn controls the engine. Similarly, the controller 212 may receive signals indicative of rotational speed, gear or speed ratio, torque, and power of the transmission, and may control those some aspects of the operation of the transmission, including through an intermediate component such as a transmission control unit (TCU). While the controller 212 is described above as communicating with the various control units 202, 204, 206, in various embodiments such control units 202, 204, 206 and the controller 212 may be integrated into a common control unit while providing substantially the same end functionality.

The controller 212 may also communicate with another controller located on the work unit or through a cellular or satellite communication unit to a controller located remotely, such as a server or a device operated by a remote owner, operator, or fleet manager. Communication with such controllers may be utilized to set certain parameters of the controller 212, or for the controller 212 to report out parameters of the operation of the work unit, such as the payloads hauled, the route taken, the areas which received unloaded material, etc.

The controller 212 further includes or may be associated with a processor 250, a computer readable medium 252, and data storage 256 such as including or functionally linked to a database network. It is understood that the controller 212 described herein may be a single controller having some or all of the described functionality, or it may include multiple controllers wherein some or all of the described functionality is distributed among the multiple controllers.

Various operations, steps or algorithms as described in connection with the controller 212 can be embodied directly in hardware, in a computer program product such as a software module executed by the processor 250, or in a combination of the two. The computer program product can reside in RAM memory, flash memory, ROM memory, EPROM memory, EEPROM memory, registers, hard disk, a removable disk, or any other form of computer-readable medium 252 known in the art. An exemplary computer-readable medium 252 can be coupled to the processor 250 such that the processor 250 can read information from, and write information to, the memory/storage medium 252. In the alternative, the medium 252 can be integral to the processor 250. The processor 250 and the medium 252 can reside in an application specific integrated circuit (ASIC). The ASIC can reside in a user terminal. In the alternative, the processor 250 and the medium 252 can reside as discrete components in a user terminal.

The term "processor" 250 as used herein may refer to at least general-purpose or specific-purpose processing devices and/or logic as may be understood by one of skill in the art, including but not limited to a microprocessor, a microcontroller, a state machine, and the like. A processor 250 can also be implemented as a combination of computing devices, e.g., a combination of a DSP and a microprocessor, a plurality of microprocessors, one or more microprocessors in conjunction with a DSP core, or any other such configuration.

The communications unit 254 may support or provide communications between the controller 212 and external communications units, systems, or devices, and/or support or provide communication interface with respect to internal components of the work unit. The communications unit may include wireless communication system components (e.g., via cellular modem, WiFi, Bluetooth or the like) and/or may include one or more wired communications terminals such as universal serial bus ports.

The data storage 256 as further described below may, unless otherwise stated, generally encompass hardware such as volatile or non-volatile storage devices, drives, electronic memory, and optical or other storage media, as well as in certain embodiments one or more databases residing thereon.

Figure 4:
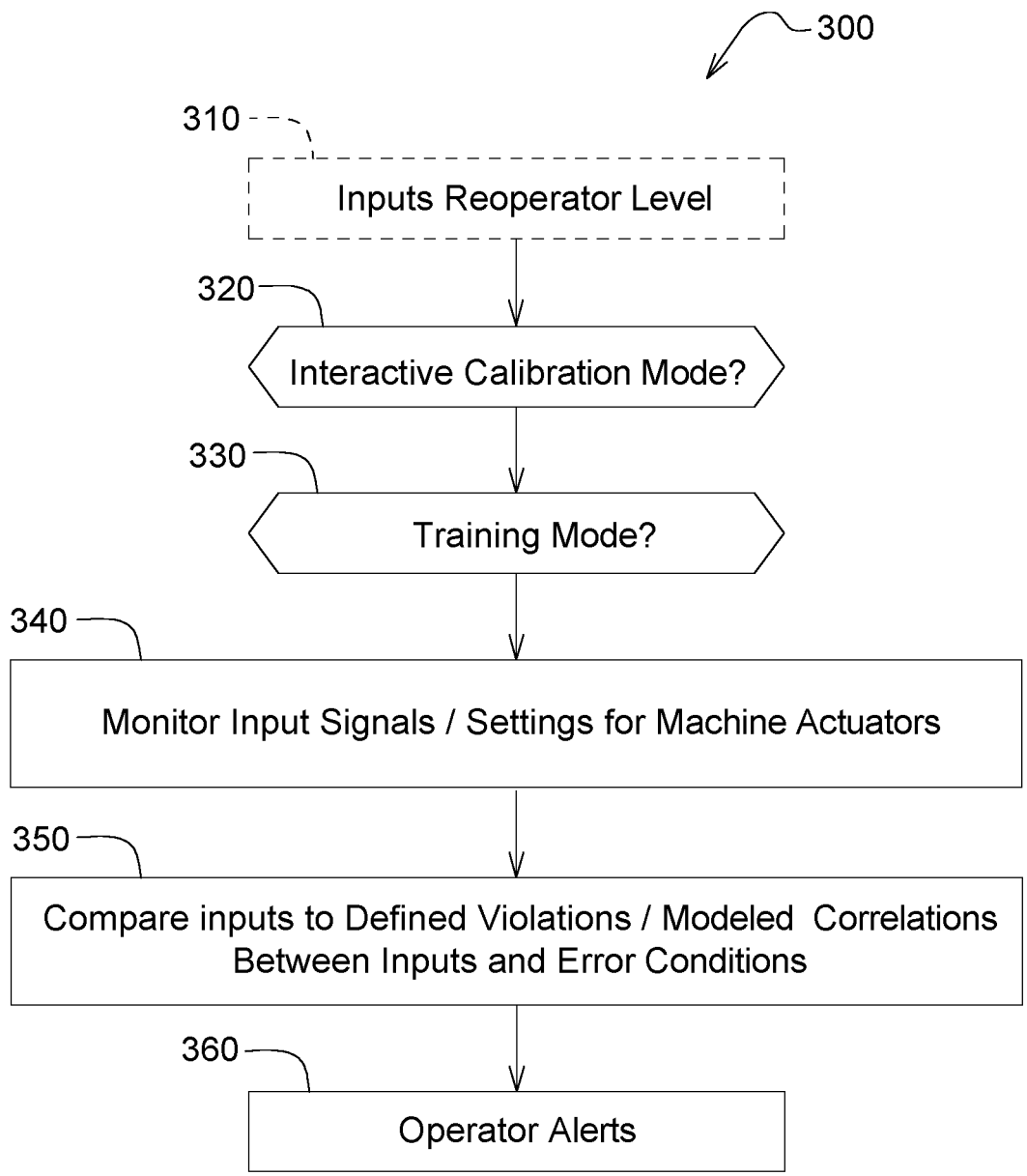
FIG. 4 is a flowchart representing an exemplary embodiment of a method for operating a work unit as disclosed herein.

Referring next to FIG. 4, with further illustrative reference back to FIGS. 1-3, an embodiment of a method 300 may now be described which is exemplary but not limiting on the scope the present disclosure unless otherwise specifically noted. One of skill in the art may appreciate that alternative embodiments may include fewer or additional steps, and that certain disclosed steps may for example be performed in different chronological order or simultaneously. Unless otherwise specifically noted, operations, steps, functions, processes, and the like as disclosed in association with the method 300 may be executed or directed by a single computing device, or via multiple computing devices in operable communication via a communications network. Exemplary such computing devices may include onboard controllers or machine control systems, remote servers, mobile user devices, and the like.

As illustrated in FIG. 4, the method 300 may include, if not necessarily begin with, a determination in step 310 regarding a skill level of the operator of the work unit, or more generally whether a first (e.g., "training") operating mode is to be utilized rather than a second (e.g., "standard") operating mode.

In an embodiment, the operating mode may be manually selectable, at the operator interface 220 or otherwise remotely defined.

In some embodiments, an operator skill level may be manually selected wherein the operating mode is determined according to the skill level.

In some optional embodiments, the operating mode may be determined according to the skill level and further in view of a defined set of tasks associated with a current work cycle for the work unit. For example, a training mode may be unnecessary if the work unit is assigned to a relatively simple set of tasks but programmatically utilized if the work unit is assigned to more complex tasks.

In an embodiment, an operation of the work unit may be monitored over time and a skill level automatically ascertained for the operator based at least in part on performance metrics, wherein the training mode may be determined at least in part on the operator skill level from prior performance, optionally in view of prior performance with respect to an upcoming work cycle/set of tasks.

The method 300 may further optionally include determining (step 320) whether or not an interactive calibration mode is required before proceeding. Calibration may for example be required to confirm a position of the ground plane, for example generally with each initialization of the work unit before a work cycle, before commencing a particular set of tasks, etc. Additional details regarding an exemplary such calibration mode are further provided below.

If a training mode is required in step 330, based for example on the determined operator skill level or simply a direct selection of the training mode as an operating model for the work unit, the method proceeds accordingly. In various embodiments of an operating method 300 for a work unit, whether provided with a scraper or other form of work implement, more than one training mode may be available depending for example on varying skill levels and corresponding defined training routines, and/or more than one alternative mode may be utilized within the scope of the present disclosure.

As previously noted, a scraper operator training mode as disclosed herein may desirably at least notify the operator when they are doing something potentially damaging to one or more scraper components, or otherwise introducing inefficiency into their operation. In a primary embodiment of a training mode as disclosed herein, the method 300 continues in step 340 by monitoring input signals and/or settings for scraper actuator positions and optionally for work vehicle operating parameters corresponding for example to a work unit travel speed.

Figure 5:
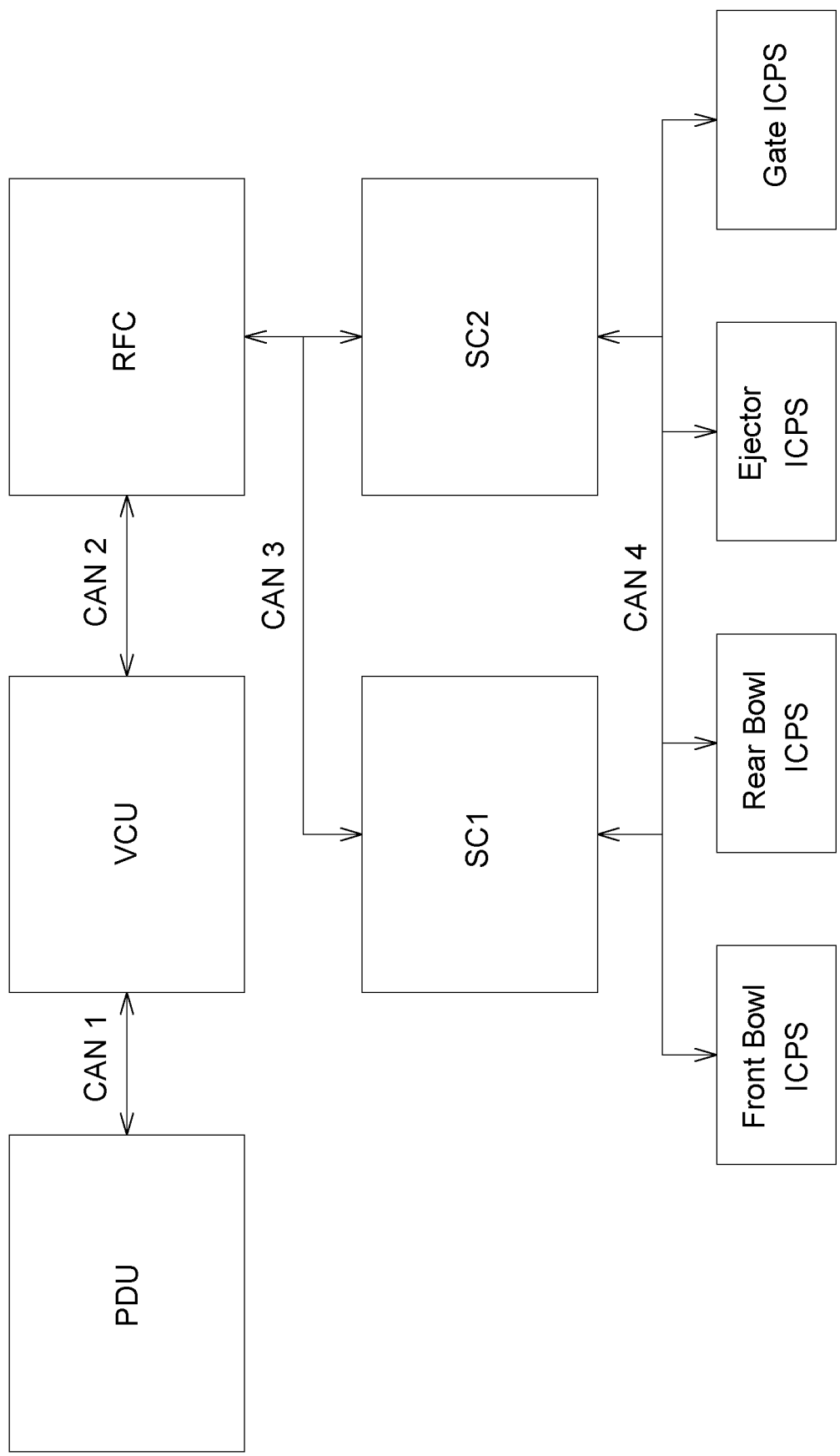
FIG. 5 is a block diagram representing an exemplary interconnection of work unit components during an operator training routine according to an embodiment of the present disclosure.

With further reference to FIG. 5, an exemplary controlled area network (CAN) messaging architecture is illustrated for carrying out an embodiment of the training mode as disclosed herein. In the present embodiment, scraper controllers SC1, SC2 communicate with sensors 210a, 210b, 210c, 210d associated with front bowl actuator 26, rear bowl actuator 28, pushing actuator 40, and gate actuator 42, for example via local controllers and CAN4.

Scraper controllers SC1, SC2 communicate with rear frame controller (RFC) via CAN3, further thereby to vehicle control unit (VCU) 212 via CAN2, still further thereby to display unit (PDU) 222 via CAN1. Other control units associated with the work vehicle may provide information such as a current transmission gear as relevant to the present method 300, but such components are collectively referenced as the vehicle control unit and associated vehicle sensors 208. Either or both of the scraper controllers SC1, SC2 may respectively convey to the operator via the display unit 222, and to the controller 212 via the various intervening components, a front bowl position (e.g., as a percentage value), a scraper gate position (e.g., as a percentage value), a current scraper ejector command, etc.

The inputs from step 340 may be compared in step 350 to defined values corresponding to determined or predicted violations, error conditions, or the like. For example, the method 300 may include ascertaining one or more operational performance metrics for the positions and/or work states, or combinations thereof, of the one or more actuators based at least in part on whether the work unit is being operated in a training mode, or by an experienced operator.

As one example, an error condition may correspond to a combined set of conditions wherein the scraper front bowl 32 position is at or lower than the determined ground plane height, the ejector 38 is not sufficiently retracted, and the transmission is currently geared to move forward. A threshold variable for determining whether the ejector 38 is sufficiently retracted in the training mode may be manually set, or automatically determined based on observed historical settings associated with experienced operators.

In some embodiments, the transmission input may be omitted, but generally an operator will not be concerned about whether the ejector is still forward if the work vehicle 10 is in neutral or park, and accordingly the work unit is not preparing to cut the ground surface regardless of the relative position of the front bowl 32.

In some embodiments, the training mode routine may have an internal flag which initializes for each work cycle, wherein for example the error condition corresponding to the ejector being forward with the front bowl 32 down is only triggered a maximum number of times (e.g., once) each work cycle. This may help to ensure that a number of such corresponding alerts does not overwhelm or otherwise become a nuisance to the operator, while still serving an appropriate training purpose.

As another example, an error condition may correspond to a combined set of conditions wherein the scraper gate 36 is substantially in a lowered position, the ejector is substantially forward or moving forward from a retracted position, and the transmission is currently geared to move forward. Generally speaking, such an error condition relates to undue strain on the scraper pan that can result if the scraper gate 36 is closed and a full load is compressed thereon by the ejector 38. Threshold or non-threshold variables for determining whether the gate 36 is insufficiently raised and/or the ejector 38 is substantially forward or moving forward in the training mode may be manually set, or automatically determined based on observed historical settings associated with experienced operators.

In some embodiments, the transmission input may be omitted, but generally an operator will not be concerned about whether the ejector is still forward if the work vehicle 10 is in neutral or park, and accordingly the work unit is not preparing to cut the ground surface regardless of the relative position or movement of the scraper.

In some embodiments, the training mode routine may have an internal flag which initializes for each work cycle, wherein for example the error condition corresponding to the gate 36 being down with the ejector 38 being or moving forward is only triggered a maximum number of times (e.g., once) each work cycle. This may help to ensure that a number of such corresponding alerts does not overwhelm or otherwise become a nuisance to the operator, while still serving an appropriate training purpose.

In an embodiment, the violations or error conditions may be determined or predicted based on selectively retrieval from data storage of modeled correlations between the current set of inputs and defined violations or error conditions. Such correlations may be general in nature, or defined for example in association with a type of work unit, a type of work being performed, a skill level of the operator, a particular operator, work unit, or operator-work unit combination, etc.

Development of such a model for classifying a work state for example including an error condition is not illustrated, nor are the specific details of such a model limiting on the scope of a method or system as disclosed herein, but may in an embodiment be performed via collection or otherwise obtaining of input data for operating parameters associated with the work unit, e.g., the work vehicle 10 and/or scraper 20, and/or additional work units of similar type. Inputs may be provided from vehicle sensors 208 configured to generate output signals representing a wheel speed, wheel slip, engine load, draft load, and/or position (e.g., location, elevation), such as may be determined using a global positioning system (GPS) transceiver. Further inputs may be provided from in-cylinder sensors 210 associated with the scraper 20 and configured to generate output signals representing a state of the ejector 38, a state of the gate 36, a blade height (absolute or relative), a fill level (e.g., using a stereo camera, profile scanner, or the like), etc. Different combinations of historical input data may be correlated with output states classified as normal, optimal, inefficient, failure, or the like, and such classifications may be manually provided by end users or in some cases automatically identifiable.

In an embodiment, determining a current work state as corresponding to operator error or inefficiency may for example be treated a classical sequence classification problem, addressed in an embodiment as disclosed herein by building supervised Machine Learning (ML)/Deep Learning (DL) classification algorithms like Logistic Regression and Long Short-Term Memory (LSTM) recurrent neural network models for sequence classification. The LSTM models are capable of learning from internal representations of the time series data, effectively remembering over long sequences of input data and previous operation of the work unit. The LSTM models may accordingly be trained on time series data and observe loss and accuracy values over N training iterations, wherein losses are decreased and accuracy increased over time.

In an embodiment, a similar model may be developed and selectively implemented by a system as disclosed herein for determining or otherwise classifying an operator skill level in determining an appropriate operating mode, or otherwise whether a training mode is appropriate for a given operator.

Upon determining in step 350 that a current configuration of work unit components justifies an alert or other form of intervention, the method 300 may continue in step 360 by generating an audible and/or visual alert to the operator. Such an alert may simply call the current situation to the attention of the operator, at least for training and/or awareness, and in some cases to prompt manual action. The alerts may for example take the form of popups superimposed on a standard display for a given work function. In some embodiments, an action of the operator or a potential subsequent action of the operator may be disabled in accordance with the alert, or a variation on an initial alert may be programmatically generated if a cause for the initial alert is not remedied or a prompted action is not affirmatively taken.

As noted above, an interactive calibration mode may be prompted in step 320 of the method 300 disclosed herein. An interactive calibration mode may also be prompted and executed.

Figure 6:
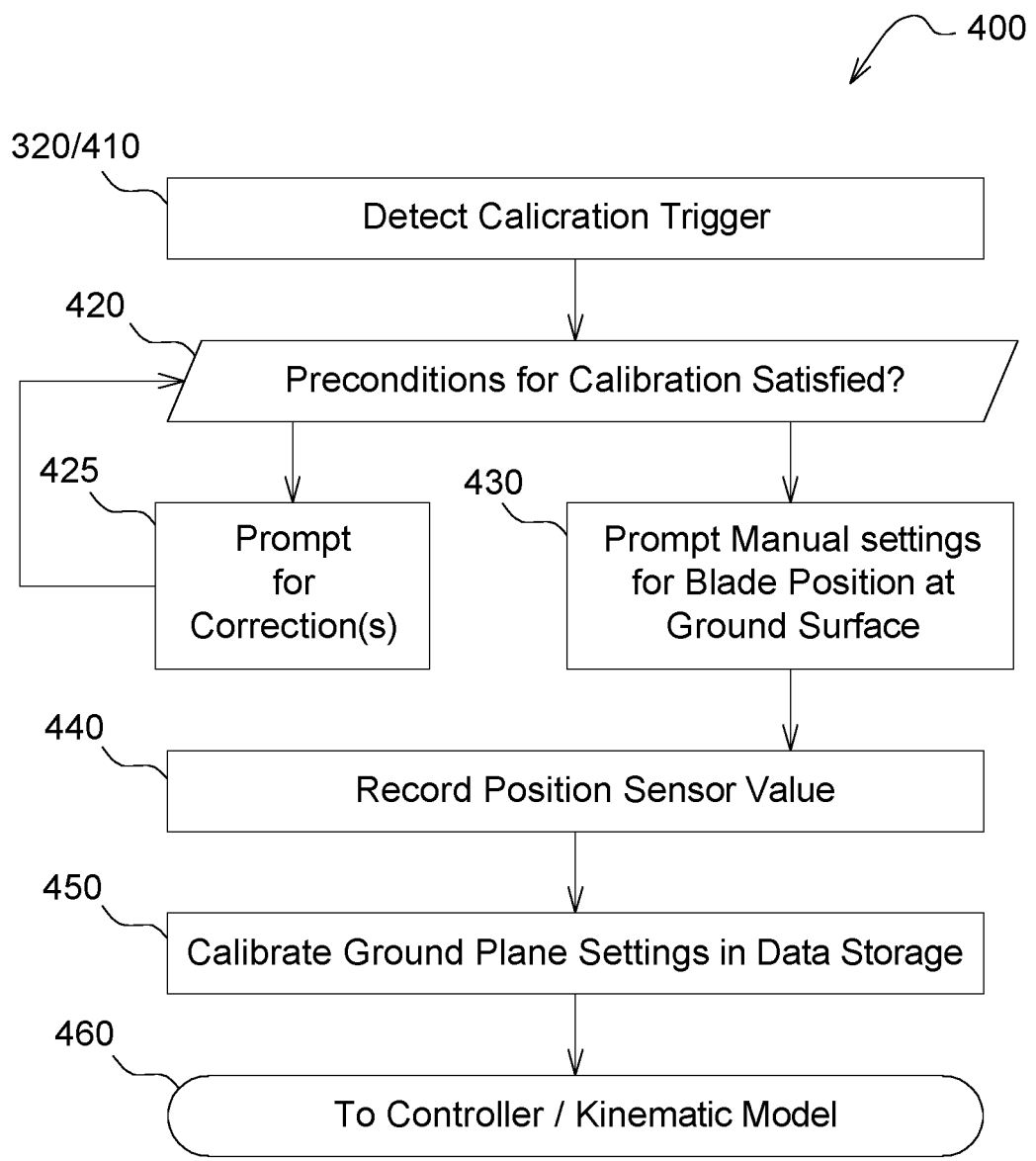
FIG. 6 is a flowchart representing an exemplary embodiment of a ground plane calibration routine according to the present disclosure.

Referring now to FIG. 6, an embodiment of an interactive calibration routine 400 may be described, for example beginning with detection of a calibration trigger in step 320 of the above-referenced method 300 as corresponding with a training mode. The calibration routine 400 may alternatively be prompted and executed without any of the other steps in the method 300, and by operators of all skill levels of operators responsive to a calibration trigger (step 410), for example the ground plane calibration being prompted in accordance with certain operations of the work unit requiring advanced automation capabilities of in-cylinder position sensing with respect to a device for working the ground. The calibration trigger may be manually provided, or may be automatically detected based on an identified work plan, attachment of a type of implement, initialization of the work unit, or the like.

Before the calibration routine can proceed, a number of preconditions may require confirmation (step 420). For example, a calibration mode and associated routine as disclosed herein may be disabled or otherwise not made available for operator selection if the scraper does not include in-cylinder position sensing capabilities. The calibration routine may be delayed or even aborted if, e.g., the work vehicle parking brake is released, the current transmission gear is not in neutral, the engine is not running, the in-cylinder position sensors of the scraper are not properly functioning and/or communicating, etc. In an embodiment, a display corresponding to initiation of the calibration routine may include each such precondition along with indicia indicating whether the precondition has been satisfied or otherwise that further action by the operator is required to satisfy the precondition (step 425).

Once the preconditions have been satisfied, the routine continues by prompting the operator via the operator interface 220 to lower the blade 30 to engage the ground plane (step 430). Once the blade is on the ground plane, the in-cylinder sensor reading may be recorded (step 440) and used for example to calibrate any ground plane settings in data storage for use in features that rely on knowledge of the ground plane (step 450). In one example, the calibrated ground plane settings may be provided as an input or point of reference for a work unit kinematic model (step 460).

Ascertaining that the implement is in contact with the ground plane may for example be based on further user input as an indication that the ground plane has been achieved. If the implement (e.g., blade) is being manually adjusted by the operator, ascertaining that the implement is in contact with the ground plane may correspond to a lack of further user input causing the implement to move.

Alternatively, the ground plane may be automatically detected utilizing a measured movement characteristic (e.g., velocity) of the implement (e.g., blade), for example detecting when the measured velocity of the cylinder decreases, indicating the blade has come into contact with the ground plane, and at which point further movement of the blade is automatically disabled. A position corresponding with the exact moment in which the velocity decrease occurred may be captured and utilized as the ground plane. The method may further include prompting the operator for confirmation that the detected ground plane is correct. In the event of automatic blade movement and ascertaining of the ground plane, the method may further include determining that the ground plane has not been properly detected, or determining a lack of confidence in a detected ground plane, in which event the operator may be prompted to manually place the blade on the ground surface.

Figure 8:
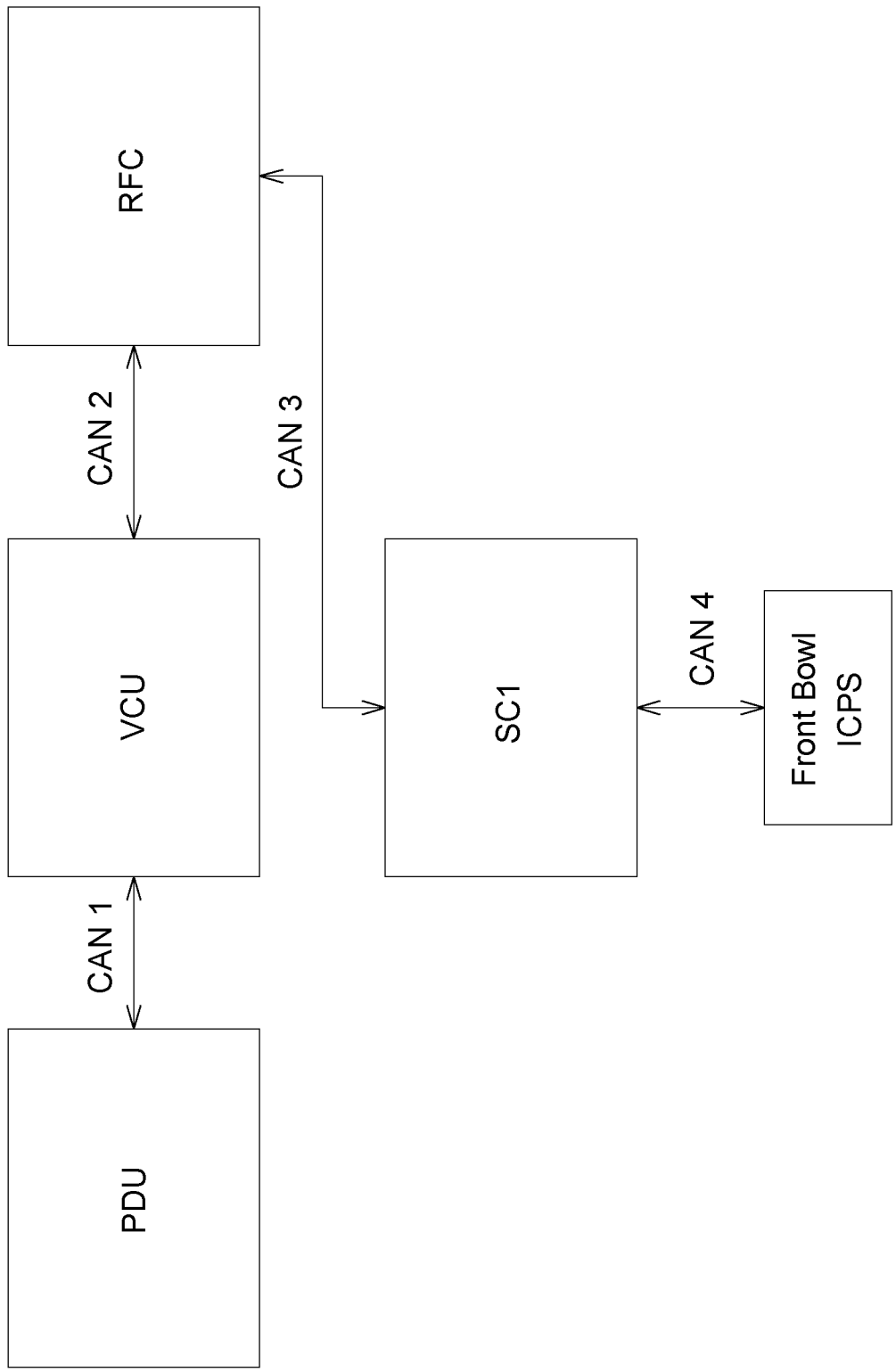
FIG. 8 is a block diagram representing an exemplary interconnection of work unit components during a ground plane calibration routine according to an embodiment of the present disclosure.

With further reference to FIG. 8, an exemplary controlled area network (CAN) messaging architecture is illustrated for carrying out an embodiment of the calibration mode as disclosed herein. In the present embodiment, a scraper controller SC1 communicates with actuator position sensor (ICPS) 210b associated with front bowl actuator 26 via CAN4. Scraper controller SC1 further communicates with rear frame controller (RFC) via CAN3, further thereby to vehicle control unit (VCU) via CAN2, still further thereby to display unit (PDU) 222 via CAN1. Other control units associated with the work vehicle may provide information such as regarding a current state of the parking brake, current transmission gear, engine, etc., but such components are collectively referenced as the vehicle control unit and associated vehicle sensors 208.

In various embodiments, although not indicated in FIG. 6, the calibration routine may be manually aborted by the operator at any point therein, or may for example be automatically aborted or at least delayed if communications are disrupted from the respective sensors.

In an embodiment, in addition to the above-referenced preconditions before initiating the operator prompt and subsequent calibration functions, there may be various conditions to be met during the routine and before proceeding to a subsequent portion. For example, the calibration routine may be aborted or at least delayed if the detected front bowl position if above a first threshold (e.g., 35%) or below a second threshold (e.g., −15%).

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A computer-implemented operational training support method for a work unit comprising a work vehicle with an implement for working material, the method comprising:
   identifying a current operating mode from at least a first operating mode and a second operating mode, wherein each operating mode corresponds to a respective operator skill level;
   in at least the first operating mode, comprising an operator training routine:
      monitoring input signals corresponding to current values of respective positions and/or work states for one or more actuators associated with working of material by the implement;
      ascertaining one or more operational performance metrics for the positions and/or work states, or combinations thereof, of the one or more actuators based at least in part on the identified operating mode; and
      automatically generating output signals to cause audible and/or visual alerts via an operator interface associated with the work vehicle, based on a comparison of the current values with respect to the operational performance metrics.

2. The method of claim 1, further comprising monitoring a movement speed of the work vehicle, wherein the output signals to cause audible and/or visual alerts are disabled or enabled dependent on the movement speed of the work vehicle.

3. The method of claim 1, wherein a number of audible and/or visual alerts corresponding to a violation of at least a first operational performance metric is limited to a maximum number for a specified work cycle.

4. The method of claim 1, wherein the output signals are automatically generated to cause audible and/or visual alerts based on a determined error condition from a plurality of available error conditions, wherein one or more models comprise identified correlations between respective error conditions and historical values of respective positions and/or work states for the one or more actuators.

5. The method of claim 1, wherein the operational performance metrics are defined to enable the audible and/or visual alerts for at least the first operating mode and to disable the audible and/or visual alerts for at least the second operating mode.

6. The method of claim 4, wherein the operator skill level is determined at least in part based upon historical data correlating the respective operator to one or more of the plurality of available error conditions.

7. The method of claim 1, further comprising:
   detecting a trigger for calibration of input signals from at least a first actuator;
   responsive to the detected trigger, prompting an adjustment to a position associated with the at least first actuator, such that the implement is brought into contact with a ground plane; and
   upon ascertaining that the implement is in contact with the ground plane, recording respective values corresponding to current input signals from the at least first actuator and calibrating the respective values to a ground plane setting.

8. The method of claim 7, wherein ascertaining that the implement is in contact with the ground plane comprises measuring a movement characteristic of the implement and detecting an end of the measured movement characteristic as the implement being in contact with the ground plane.

9. The method of claim 8, wherein the adjustment is only prompted responsive to the detected trigger and to satisfying each of a plurality of preconditions corresponding to specified values of respective positions and/or work states for the one or more actuators.

10. A work unit comprising a self-propelled work vehicle and an implement for working material;
   a first set of sensors configured to generate data corresponding to operating parameters of the work vehicle;
   a second set of sensors configured to generate data corresponding to current values of respective positions and/or work states for one or more actuators associated with loading and/or unloading of material by the implement; and
   a controller linked to receive the data from the first set of sensors and the second set of sensors, and configured to identify a current operating mode from at least a first operating mode and a second operating mode, wherein each operating mode corresponds to a respective operator skill level; and for at least the first operating mode, comprising an operator training routine:

ascertain one or more operational performance metrics for the positions and/or work states, or combinations thereof, of the one or more actuators based at least in part on the identified operating mode, and automatically generate output signals to cause audible and/or visual alerts via an operator interface associated with the work vehicle, based on a comparison of the current values with respect to the operational performance metrics.

11. The work unit of claim 10, wherein the work vehicle comprises a tractor configured to provide tractive force with respect to a scraper unit comprising a loading container and a scraper blade as the implement.

12. The work unit of claim 10, wherein the work vehicle has integrated therewith a scraper unit comprising a loading container and a scraper blade as the implement.

13. The work unit of claim 10, wherein the one or more actuators comprise respective hydraulic cylinder units configured through controllable extension and retraction thereof to drive movement of an ejector, a gate, and a loading container, and wherein the second set of sensors comprise at least one sensor residing in or upon each of the respective hydraulic cylinder units.

14. The work unit of claim 13, wherein a number of audible and/or visual alerts corresponding to a violation of at least a first operational performance metric is limited to a maximum number for a specified work cycle.

15. The work unit of claim 13, wherein the output signals are automatically generated to cause audible and/or visual alerts based on a determined error condition from a plurality of available error conditions, wherein one or more models comprise identified correlations between respective error conditions and at least historical values of respective positions and/or work states for the one or more actuators.

16. The work unit of claim 15, wherein the operator skill level is determined at least in part based upon historical data correlating the respective operator to one or more of the plurality of available error conditions.

17. The work unit of claim 11, wherein the controller is further configured to:

detect a trigger for calibration of input signals from at least a first actuator;

responsive to the detected trigger, to prompt an adjustment to a position associated with the at least first actuator, such that the implement is brought into contact with a ground plane; and upon ascertaining that the implement is in contact with the ground plane, to record respective values corresponding to current input signals from the at least first actuator and calibrating the respective values to a ground plane setting.

18. The work unit of claim 17, wherein ascertaining that the implement is in contact with the ground plane comprises measuring a movement characteristic of the implement and detecting an end of the measured movement characteristic as the implement being in contact with the ground plane.

19. The work unit of claim 18, wherein the adjustment is only prompted responsive to the detected trigger and to satisfying each of a plurality of preconditions corresponding to specified values of respective positions and/or work states for the one or more actuators.

20. A system for operational training support with respect to a work unit comprising a work vehicle having an implement for working material, the system comprising:

one or more processors communicatively linked to an operator interface and one or more sensors associated with the work unit, and configured to:

identify a current operating mode from at least a first operating mode and a second operating mode, wherein each operating mode corresponds to a respective operator skill level; and at least during the first operating mode, comprising an operator training routine:

monitor input signals from the one or more sensors corresponding to current values of respective positions and/or work states for one or more actuators associated with loading and/or unloading of material by the implement;

ascertain one or more operational performance metrics for the positions and/or work states, or combinations thereof, of the one or more actuators based at least in part on the identified operating mode; and automatically generate output signals to cause audible and/or visual alerts via the operator interface, based on a comparison of the current values with respect to the operational performance metrics.

* * * * *